C. J. TROPPMAN.
GOGGLES OR EYE PROTECTOR.
APPLICATION FILED JAN. 11, 1915.
1,168,581.  Patented Jan. 18, 1916.
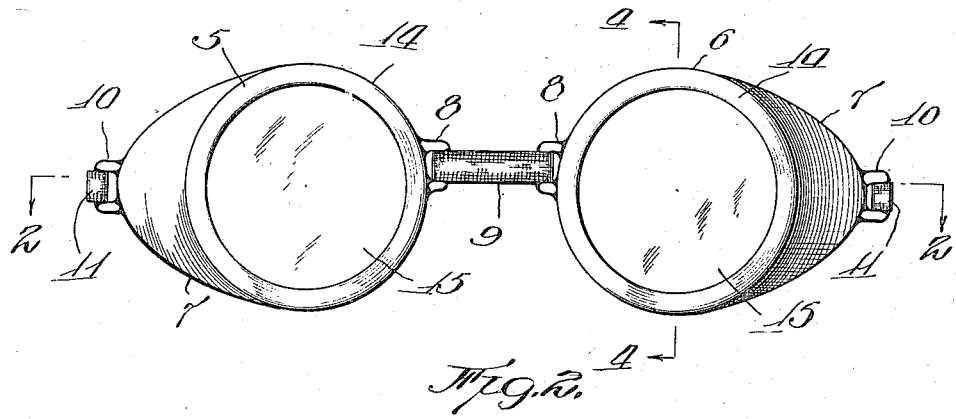
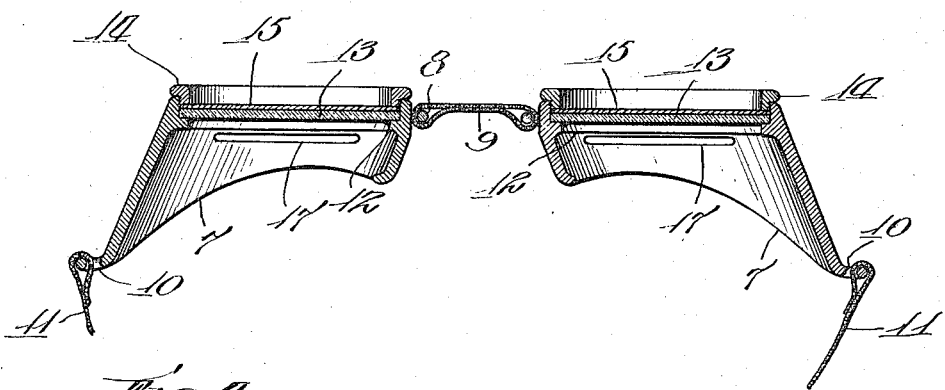
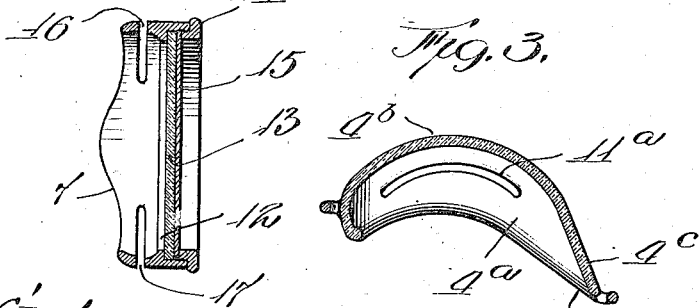
Witnesses:  Inventor:
Charles J. Troppman

UNITED STATES PATENT OFFICE.

CHARLES J. TROPPMAN, OF CHICAGO, ILLINOIS, ASSIGNOR TO F. A. HARDY & COMPANY, OF CHICAGO, ILLINOIS, A CORPORATION OF ILLINOIS.

GOGGLES OR EYE-PROTECTOR.

1,168,581.      Specification of Letters Patent.      Patented Jan. 18, 1916.

Application filed January 11, 1915. Serial No. 1,484.

*To all whom it may concern:*

Be it known that I, CHARLES J. TROPPMAN, a citizen of the United States, and a resident of Chicago, in the county of Cook and State of Illinois, have invented certain new and useful Improvements in Goggles or Eye-Protectors, of which the following is a specification.

There are various industrial operations, in which the operatives are not only subject to flying particles but to very intense light and heat and electrical conditions, from all of which the eyes should be carefully shielded and protected. A goggle should be ventilated both for the sake of the eyes and to keep the lenses from being dimmed by the condensation of moisture on the inner surfaces thereof, and provision for such necessary ventilation should not permit access to the eyes of flying fragments, or heat or light radiation. A goggle should also preferably be so made that it may be completely sterilized after use so that it may be reissued to the same or a different workman without fear of occasioning an infection. It is also desirable to so form the goggle that cover glasses capable of easy removal may be placed in front of the lenses proper both for the purpose of protecting the lenses from flying particles and by using different colors and shades of color glasses to dim or modify an otherwise too intense glare of light. Goggles of the class described should also, preferably, be designed so that they may be formed from a material which is a good non-conductor of both heat and electricity.

My present invention has for its object the provision of a goggle or eye protector which shall be efficacious in affording protection and meeting the requirements under the above indicated conditions.

I attain my objects by means of the structure illustrated in the accompanying drawings, in which—

Figure 1 is a front elevation of a pair of goggles embodying my invention; Fig. 2 is a central longitudinal section on line 2—2 of Fig. 1; Fig. 3 is a horizontal section of a slightly modified form of eye cup; and Fig. 4 is a vertical section on line 4—4 of Fig. 1.

Similar reference characters refer to similar parts throughout the several views.

The goggles comprise a separate eye cup 5 and 6, for each eye. The eye cups are of substantially cylindrical form, the rear edges, 7, thereof being formed on a line, diagonal to the axis of the cylinder, and so as to conform to the face about the eye, the general diagonal disposition of the rear edges being for the purpose of causing a convergence of the eye cups so that they will rest upon the nose and receive support therefrom and be steadied thereby.

Upon opposite portions of the front edges of each eye cup are provided substantially U-shaped lugs, 8, through which pass a suitable flexible connection or strap, 9, for securing the respective eye cups together and forming a bridge to conform to and rest upon the crest of the bridge of the nose.

Upon the outer rear edges of the eye cups are provided similar substantially U-shaped lugs, 10, for securing a flexible and elastic strap, 11, for encircling and securing the goggles to the head of the wearer.

Upon the inside of each eye cup, a short distance from the front edges thereof is provided an annular shoulder or flange, 12, against which a lens, 13, is adapted to seat. From the annular shoulder or flange, 12, to the front edges, the eye cups are interiorly threaded to receive the exteriorly threaded flanged retaining bushing, 14, for holding the lenses in place. As shown, cover glasses, 15, for protecting the lenses or dimming or coloring the light may be removably inserted in front of the lenses.

The walls of the eye cups are preferably made quite thick and narrow slots, 16 and 17, are provided in the bottoms and tops thereof respectively just back of the flanges, 12. The disposition of these slots, one above the other, provides ample ventilation, and comprising but relatively narrow slots in a comparatively thick wall, they cause any ray of light which may enter therethrough to impinge against the opposite wall of the eye cup instead of entering the eye.

The design of goggles just described may be easily molded or cast of condensite, or other condensation product of phenol and formaldehyde, and when so made they constitute excellent protection against heat and light radiation and also from electric discharges. With such a goggle the straps, 9 and 11, may be removed and the eye cups and lenses thoroughly sterilized by immersion in any suitable sterilizing liquid.

In Fig. 3 I have illustrated a modified form of eye cup in which the eye cup, 4ª, and lens is made integrally from a suitable transparent substance. In such a form the front or lens portion, 4ᵇ, is preferably given a concavo-convex or meniscus form, the curve of which is eased or gradually merged into the tubular portion 4ᶜ; the rear edges 4ᵈ, in this form are of the same design as in the form first described. In the modified form the walls are also made relatively thick and are provided with upper and lower relatively narrow ventilating slots 11ª to prevent dust, light or heat finding access therethrough to the eye.

Having described my invention what I claim as new and desire to secure by Letters Patent is,—

1. In an eye protector or goggle, an eye cup the walls of which at the top and bottom have vertically alining slots of less width than the thickness of the walls of the cup, a window in the front of said cup, said slots being positioned substantially adjacent said window whereby rays of light entering said slots are directed against the opposite wall of the cut instead of into the eyes of the wearer.

2. In an eye protector or goggle, an eye cup comprising an integral shell, the rear edges of the walls whereof are adapted to conform to the face of the wearer about the eye and the front edges of the walls whereof are adapted to retain a window, said walls being provided at their respective top and bottom with a pair of vertically alining slots of less width than the thickness of the walls of the cup substantially adjacent said window, which communicate directly with the exterior and the interior of said cup, whereby rays of light entering the cup through said slots are directed against the opposite wall of the cup instead of into the eyes of the wearer.

In testimony whereof I have hereunto set my hand this 5th day of Jan:, 1915, at Chicago, Cook county, Illinois.

CHARLES J. TROPPMAN.

Witnesses:
E. O. TROEGER,
BENJ. T. ROODHOUSE.